(12) United States Patent
Iwano et al.

(10) Patent No.: US 10,001,178 B2
(45) Date of Patent: Jun. 19, 2018

(54) ONE-WAY CLUTCH

(71) Applicant: NSK-WARNER K.K., Shinagawa-ku, Tokyo (JP)

(72) Inventors: Akira Iwano, Fukuroi (JP); Takaya Yamada, Kakegawa (JP)

(73) Assignee: NSK-WARNER K.K., Tokyo (JP)

( * ) Notice: Subject to any disclaimer, the term of this patent is extended or adjusted under 35 U.S.C. 154(b) by 0 days. days.

(21) Appl. No.: 15/249,428

(22) Filed: Aug. 28, 2016

(65) Prior Publication Data
US 2017/0089411 A1    Mar. 30, 2017

(30) Foreign Application Priority Data

Sep. 24, 2015 (JP) .................................. 2015-186842

(51) Int. Cl.
*F16D 41/066* (2006.01)
*F16D 41/067* (2006.01)
(Continued)

(52) U.S. Cl.
CPC .......... *F16D 41/066* (2013.01); *F16D 15/00* (2013.01); *F16D 41/06* (2013.01); *F16D 41/067* (2013.01);
(Continued)

(58) Field of Classification Search
CPC .......... F16D 41/067; F16D 2041/0643; F16D 41/0605; F16D 41/06; F16D 41/066
See application file for complete search history.

(56) References Cited

U.S. PATENT DOCUMENTS

| 4,901,831 A * | 2/1990 | Ito .......................... B62D 5/043 180/444 |
| 6,502,679 B1 * | 1/2003 | Wang ...................... F16D 41/28 192/45.02 |

(Continued)

FOREIGN PATENT DOCUMENTS

| DE | 28 21 856 A1 | 11/1978 |
| JP | 2011-133103 A | 7/2011 |
| JP | 2014-173570 A | 9/2014 |

OTHER PUBLICATIONS

Extended European Search Report dated Feb. 24, 2017, in European Patent Application No. EP16188649.4 , 6 pages.

*Primary Examiner* — Ramya P Burgess
*Assistant Examiner* — Lillian T Nguyen
(74) *Attorney, Agent, or Firm* — Shapiro, Gabor and Rosenberger, PLLC

(57) ABSTRACT

A one-way clutch allows unlocking torque input to a movable retainer to be made low, thereby enabling downsizing of an external apparatus that inputs unlocking torque to the movable retainer. The one-way clutch includes an inner ring, an outer ring, first rollers used to transmit torque between the inner ring and the outer ring provided in an annular space between the inner ring and the outer ring, and fixed retaining portions of a fixed retainer and a movable retaining portions of a movable retainer that are arranged alternately. The one-way clutch also includes second rollers provided between the movable retaining portions and the first rollers adapted to transmit unlocking torque from the movable retaining portions to the first rollers and the inner ring as the movable retaining portions move in a clockwise direction.

6 Claims, 5 Drawing Sheets

(51) Int. Cl.
    *F16D 41/08*     (2006.01)
    *F16D 15/00*     (2006.01)
    *F16D 41/06*     (2006.01)
    *F16D 41/064*     (2006.01)

(52) U.S. Cl.
    CPC ............... *F16D 2041/0605* (2013.01); *F16D 2041/0643* (2013.01)

(56) References Cited

U.S. PATENT DOCUMENTS

| | | | |
|---|---|---|---|
| 8,613,350 B2* | 12/2013 | Nease, III | F16D 41/088 192/44 |
| 2005/0115358 A1 | 6/2005 | Hamasaki et al. | |
| 2010/0051402 A1 | 3/2010 | Yamamoto | |
| 2011/0127134 A1 | 6/2011 | Iwano et al. | |
| 2014/0069761 A1* | 3/2014 | Schoolcraft | F16D 41/088 192/45.005 |

* cited by examiner

ONE-WAY CLUTCH

This application claims the benefit of Japanese patent application No. 2015-186842 which is hereby incorporated by reference.

TECHNICAL FIELD

The present invention relates to a one-way clutch that is used to transmit torque in vehicles and industrial machines. More particularly, the present invention relates to a one-way clutch having an unlocking function that can be used for rotational position control.

BACKGROUND ART

In some roller type one-way clutches, a locked state in which the inner ring and the outer ring are locked by rollers is released by moving the rollers by a movable retainer in a an unlocking direction (see e.g. patent literature 1). Such one-way clutches are used, for example, to control rotational position. In some cases, such one-way clutches are used as inverse input blocking clutches as disclosed in patent literature 2.

FIG. 4A is a partial cross sectional view of a conventional one-way clutch in the locked state seen from an axial direction. FIG. 4B is a cross sectional view taken along line b-b in FIG. 4A. FIG. 5 is a partial cross sectional view of the conventional one-way clutch in an unlocked state seen from the axil direction. In FIG. 4A, the right rotation direction of the one-way clutch and the rollers will be referred to as the clockwise direction, and the left rotation direction will be referred to as the anticlockwise direction. As to the circumferential directions also, the right rotation direction will be referred to as the clockwise direction, and the left rotation direction will be referred to as the anticlockwise direction.

The one-way clutch 301 shown in FIG. 4A has an inner ring 305 having an outer circumferential surface 307 on which recesses 311 recessed radially inwardly are provided. A cylindrical roller 319 is provided in each recess 311 in such a way as to be capable of rotating or sliding along the circumferential direction.

The radial distance between the bottom of the recess 311 and the inner circumferential surface 309 of the outer ring is larger than the diameter of the roller 319. The bottom surface 323 of the recess 311 is a curved surface that is inclined in such a way that the distance between the bottom surface 323 and the inner circumferential surface 309 of the outer ring decreases as it extends in the anticlockwise direction. Thus, the bottom surface 323 of the recess 311 and the inner circumferential surface 309 of the outer ring radially opposed to it define a wedge-shaped space W301 therebetween. The radial dimension of the wedge-shaped space 301 is smaller than the diameter of the roller 319. The bottom surface 323 of the recess 311 serves as a cam surface with which the roller engages.

The one-way clutch 301 includes a fixed retainer 327 fixed to the inner ring 305 and a movable retainer 333 that is movable relative to the inner ring 305. The fixed retainer 327 has a plurality of fixed retaining parts 331 arranged at regular intervals along the circumferential direction between the inner ring 305 and the outer ring 303. The movable retainer 333 has a plurality of movable retaining parts 337 arranged at regular intervals along the circumferential direction between the inner ring 305 and the outer ring 303. The fixed retaining parts 331 and the movable retaining parts 337 are arranged alternately along the circumferential direction as shown in FIG. 4A. The fixed retaining part 331 is arranged on the clockwise side of each roller 319, and the fixed retaining part 337 is arranged on the anticlockwise side of each roller 319.

In the state shown in FIG. 4A, the roller 319 is biased toward the anticlockwise direction by a spring provided on the anticlockwise end of the fixed retaining part 331, so that the roller engages with the bottom surface 323 serving as a cam surface and the inner circumferential surface 309 of the outer ring on the anticlockwise side. In this state, the inner ring 305 and the outer ring 303 is in a locked state, preventing rotation of the inner ring 305 in the clockwise direction.

As shown in FIG. 5, when releasing the locked state in which the inner ring 305 and the outer ring 303 are locked, the movable retaining parts 337 of the movable retainer 333 move clockwise toward the rollers 319 as indicated by an arrow D31 to come in contact with the rollers 319 and push the rollers 319 in the clockwise direction as indicated by an arrow D32 in FIG. 5. Consequently, the rollers 319 turn in the clockwise direction while rolling or sliding on the respective cam surfaces 323 and the inner circumferential surface 309 of the outer ring. Rolling or sliding of the rollers 319 on the respective cam surfaces 323 causes the inner ring 305 to turn in the unlocking direction. In this state, the rollers 319 are disengaged from the inner ring 305 and the outer ring 303 as shown in FIG. 5, thereby releasing the engagement of the inner ring 305 and the outer ring 303. Thus, the locking of the inner ring 305 and the outer ring 303 is released, allowing the inner ring 305 to turn in the clockwise direction.

CITATION LIST

Patent Literature

Patent Literature 1: Japanese Patent Application Laid-Open No. 2011-133103

Patent Literature 2: Japanese Patent Application Laid-Open No. 2014-173570

SUMMARY OF THE INVENTION

Technical Problem

To release the locking of the one-way clutch, it is necessary to move the rollers engaging with the inner ring and the outer ring in the unlocking direction and to give the rollers high impact torque for turning the inner ring in the unlocking direction by the rollers. To give such high impact torque to the rollers, it is necessary to input high impact torque or high rotation (or strong rotational force) to the movable retainer, which requires a large external apparatus that can generate high impact torque or high rotation. This leads to the problem of large installation space for the external apparatus and the problem of increase in the size of the overall apparatus including the one-way clutch and the external apparatus.

The present invention has been made in view of the above-described circumstances, and an object of the present invention is to provide a one-way clutch that allows unlocking torque input to the movable retainer to be made low, thereby enabling downsizing of an external apparatus that inputs unlocking torque to the movable retainer.

Solution to Problem

To solve the above problem, according to the present invention, there is provided a one-way clutch comprising: an inner ring; an outer ring arranged coaxially with said inner ring; a plurality of first torque transmission members provided between said inner ring and said outer ring at predetermined circumferential intervals and used to transmit a first torque between said inner ring and said outer ring; a plurality of spring members that bias said plurality of first torque transmission members to their respective torque transmission positions; a plurality of retaining portions arranged between the adjacent first torque transmission members in one-to-one correspondence with the first torque transmission members and capable of shifting said corresponding first torque transmission members from said torque transmission positions to torque transmission incapable positions by moving in one circumferential direction toward said corresponding first torque transmission members, and retaining said first torque transmission members at said torque transmission incapable positions; and a second torque transmission member provided between each of said retaining portions and said first torque transmission member corresponding thereto and used to transmit a second torque from said retaining portion to said corresponding first torque transmission member and to one of said inner ring and said outer ring when said retaining portion moves in said one circumferential direction.

In a preferred mode of the present invention, said inner ring or said outer ring has a roll surface or slide surface provided with a plurality of first cam surfaces with which said plurality of first torque transmission members engage and a plurality of second cam surfaces with which said plurality of second torque transmission members engage, and when each of said retaining portions moves in said one circumferential direction, said second torque is transmitted from said retaining portion to said corresponding first torque transmission member and to said inner ring or said outer ring via said second torque transmission member.

In a preferred mode of the present invention, a portion of said retaining portion on said one circumferential direction side is radially opposed to said second cam surface, and the surface of said portion of said retaining portion on said one circumferential direction side opposed to said second cam surface comprises an inclined surface that is inclined in such a direction that the radial interval between the surface of said portion of said retaining portion on said one circumferential direction side opposed to said second cam surface and said second cam surface increases in said one circumferential direction.

In a preferred mode of the present invention, said second torque transmission member moves in said one circumferential direction while rolling or sliding on said second cam surface and said inclined surface, thereby pushing said first torque transmission member in said one circumferential direction and transmitting a rotational force to said inner ring or said outer ring.

Advantageous Effect of the Invention

The present invention can provide a one-way clutch that allows unlocking torque input to the movable retainer to be made low, thereby enabling downsizing of an external apparatus that inputs unlocking torque to the movable retainer.

EMBODIMENTS FOR CARRYING OUT THE INVENTION

In the following, embodiments of the one-way clutch according to the present invention will be described with reference to the accompanying drawings. In this specification, the terms "axial direction", "radial direction", and "circumferential direction" refer the axial direction, radial direction, and circumferential direction of the one way clutch respectively. In other words, these terms refer to the axial direction, radial direction, and circumferential direction of the inner ring or the outer ring of the one-way clutch. Moreover, in describing the rotation or turning direction of the inner ring, the outer ring, and the rollers, the right rotation direction in FIGS. 1A, 2, and 3A will be referred to as the "clockwise direction", and the left rotation direction will be referred to as the "anticlockwise direction". As to the circumferential directions also, the right rotation direction will be referred to as the "clockwise direction", and the left rotation direction will be referred to as the "anticlockwise direction".

Moreover, the state of the one-way clutch in which the rollers engage with the inner ring and the outer ring or the state in which torque can be transmitted from the inner ring to the outer ring or from the outer ring to the inner ring will be referred to as the "locked state". The state in which the rollers are disengaged from the inner ring and the outer ring, the inner ring or the outer ring rotates idle, and torque cannot be transmitted from the inner ring to the outer ring or from the outer ring to the inner ring will be referred to as the "unlocked state".

First Embodiment

A one-way clutch according to a first embodiment of the present invention will be described.

Figures 1A, 1B:
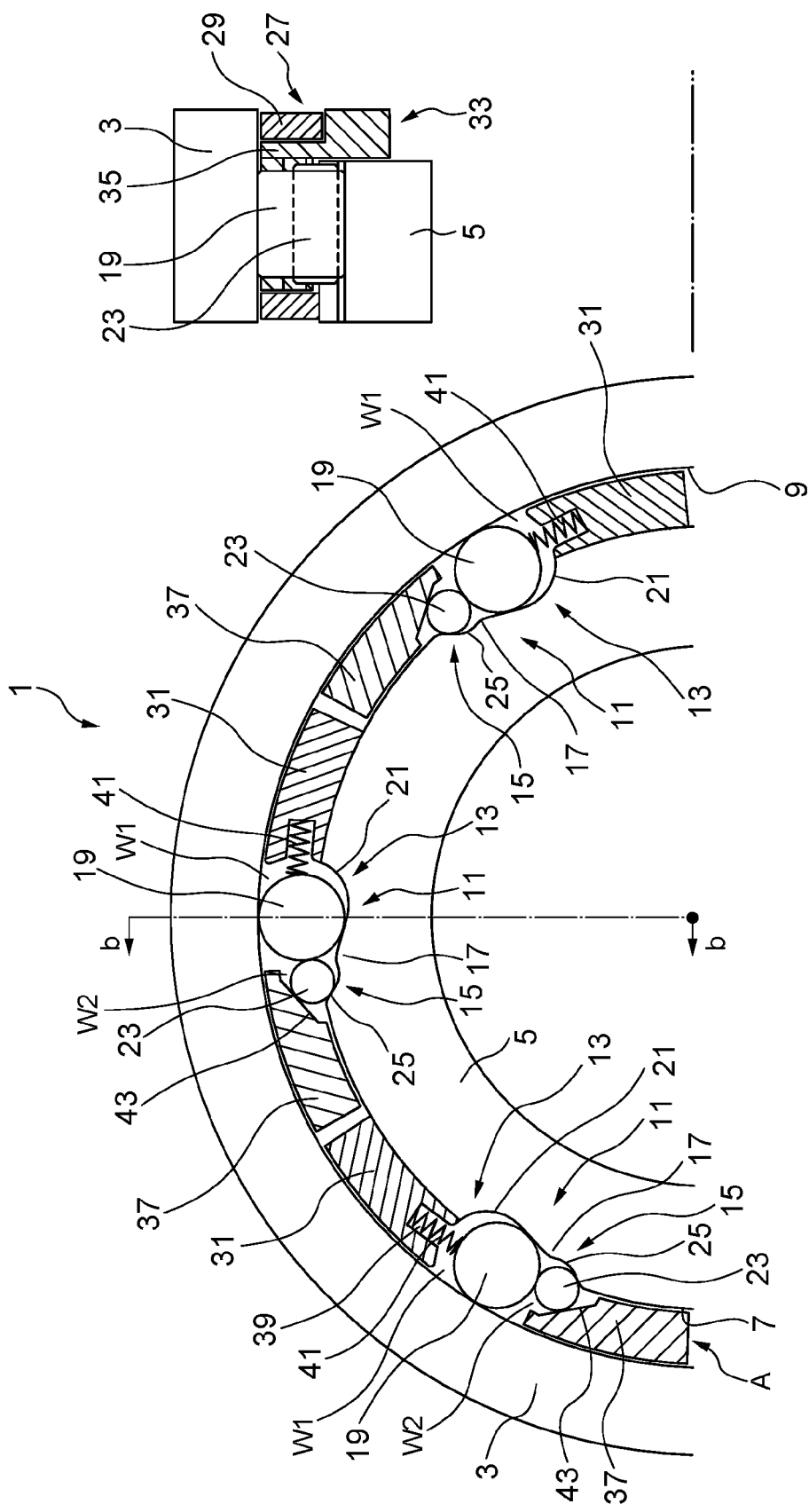
FIG. 1A is a partial cross sectional view of the one-way clutch according to a first embodiment in the locked state seen from an axial direction.
FIG. 1B is a cross sectional view taken along line b-b in FIG. 1A.

FIG. 1A is a partial cross sectional view of the one-way clutch according to the first embodiment in the locked state seen from an axial direction. FIG. 1B is a cross sectional view taken along line b-b in FIG. 1A.

When the one-way clutch according to the first embodiment is in the locked state, anticlockwise rotation of the inner ring relative to the outer ring is prevented. In other words, the inner ring is in a fixed state relative to the outer ring. In the unlocked state, the inner ring can rotate relative to the outer ring in the clockwise direction.

As shown in FIG. 1A, the one-way clutch 1 according to the first embodiment includes the outer ring 3 and the inner ring 5 arranged radially inside the outer ring 3 with spaced apart from each other. The inner ring 5 and the outer ring 3 are arranged coaxially. There is an annular space A between the outer circumferential surface 7 of the inner ring 5 and the inner circumferential surface 9 of the outer ring 3. The outer circumferential surface 7 of the inner ring 5 in the one-way clutch 1 has a plurality of recesses 11 that are recessed radially inwardly. The recesses 11 are arranged at regular intervals along the circumference. In this embodiment, the inner ring 5 has six recesses 11. FIG. 1A illustrates only three recesses out of six, located above the center of the one-way clutch 1.

Each recess 11 includes a first recessed portion 13 and a second recessed portion 15 that are continuous along the circumferential direction. There is a smooth step portion 17 between the first recessed portion 13 and the second recessed portion 15. The first recessed portion 13 is arranged on the clockwise side of the step portion 17, and the second recessed portion 15 is arranged on the anticlockwise side of the step portion 17. The first recessed portion 13 has a larger circumferential width and a greater depth than the second recessed portion 15.

In each of the first recessed portions 13, a first roller 19 having a cylindrical shape is set in such a way as to be able to roll or slide in the circumferential direction. The first roller 19 serves as a torque transmission member that engages with the outer circumferential surface 7 of the inner ring 5 and the inner circumferential surface 9 of the outer ring 3 to lock the inner ring 5 and the outer ring 3, thereby allowing torque transmission from the inner ring 5 to the outer ring 3 or from the outer ring 3 to the inner ring 5. The outer circumferential surface 7 of the inner ring 5 and the inner circumferential surface 9 of the outer ring 3 serve as roll surfaces or slide surfaces on which the first roller 19 can roll or slide.

The bottom surface 21 of the first recessed portion is a curved surface including an anticlockwise side portion that is inclined in such a direction that makes the interval between the bottom surface 21 of the first recessed portion 13 and the inner circumferential surface 9 of the outer ring 3 smaller as the anticlockwise side portion extends in the anticlockwise direction. The bottom surface 21 of the first recessed portion 13 constitutes a first cam surface engaging with the first roller 19. In the following, the bottom surface 21 of the first recessed portion 13 will be referred to as the "first cam surface 21". The first cam surface 21 of the inner ring 5 and the inner circumferential surface 9 of the outer ring 3 that is radially opposed to the first cam surface 21 form a first wedge-shaped space W1 therebetween. The radial dimension of the first wedge-shaped space W1 or the distance between the first cam surface 21 of the inner ring 5 and the inner circumferential surface 9 of the outer ring 3 decreases in the anticlockwise direction and increases in the clockwise direction. The radial dimension of the narrower portion of the first wedge-shaped space W1 is smaller than the diameter of the first roller 19.

In each of the second recessed portions 15, a second roller 23 is set in such a way as to be able to roll or slide. The outer circumferential surface 7 of the inner ring 5 serves as a roll surface or slide surface on which the second roller 23 can roll or slide. The diameter of the second roller 23 is approximately half the diameter of the first roller 19. As will be described later, the second roller 23 is an auxiliary roller used to transmit torque to the first roller 19 to shift the first roller 19 to an unlocking position when releasing the locked state of the one-way clutch 1.

The bottom surface 25 of the second recessed portion is a curved surface including an anticlockwise side portion that is inclined in such a direction that makes the interval between the bottom surface 25 of the second recessed portion 15 and the inner circumferential surface 9 of the outer ring 3 smaller as the anticlockwise side portion extends in the anticlockwise direction. The bottom surface 25 of the second recessed portion 15 constitutes a second cam surface engaging with the second roller 23. In the following, the bottom surface 25 of the second recessed portion 15 will be referred to as the "second cam surface 25".

The one-way clutch 1 includes a fixed retainer 27 that is fixed to the inner ring 5. The fixed retainer 27 has an annular portion 29 extending along the circumference of the annular space A between the inner ring 5 and the outer ring 3. As shown in FIG. 1B, the annular portion 29 is provided on the first side of the one-way clutch 1 with respect to the axial direction, that is, on the right side in FIG. 1B. This side will be referred to as the first side in the following description also. The fixed retainer 27 has a plurality of fixed retaining portions 31, which are projecting portions projecting from the annular portion 29 toward the second side of the one-way clutch 1 with respect to the axial direction, that is, the left side in FIG. 1B. This side will be referred to as the second side in the following description also.

The number of the fixed retaining portions 31 is equal to the number of the first rollers 19 (that is, six in this embodiment). The fixed retaining portions 31 are arranged at regular intervals along the circumferential direction. The fixed retaining portions 31 are arranged in the annular space A between the inner ring 5 and the outer ring 3. The fixed retaining portion 31 is shaped in such a way as to fill the annular space A over a certain circumferential length thereof. In other words, the fixed retaining portion 31 extends in the annular space A over a certain circumferential length and has a radially outside surface having a shape matching the inner circumferential surface 9 of the outer ring 3 and a radially inside surface having a shape matching the outer circumferential surface 7 of the inner ring 5. Moreover the cross sectional shape of the fixed retaining portion 31 matches the cross sectional shape of the annular space A. The fixed retaining portions keep the radial distance between the inner ring 5 and the outer ring 3 constant and retain the first rollers 19, as will be described later.

The one-way clutch 1 includes a movable retainer 33 that is movable relative to the inner ring 5. The movable retainer 33 has an annular portion 35 extending along the circumference of the annular space A between the inner ring 5 and the outer ring 3. As shown in FIG. 1B, the annular portion 35 is arranged on the first side of the one-way clutch 1 with respect to the axial direction. The movable retainer 33 has a plurality of movable retaining portions 37, which are projecting portions projecting from the annular portion 35 toward the second side with respect to the axial direction.

The number of the movable retaining portions 37 is equal to the number of the second rollers 23 (that is, six in this embodiment). The movable retaining portions 37 are arranged at regular intervals along the circumferential direction. The movable retaining portions 37 are arranged in the annular space A between the inner ring 5 and the outer ring 3. The movable retaining portions 37 of the movable retainer 33 and the fixed retaining portions 31 of the fixed retainer 27 are arranged alternately along the circumferential direction. The movable retaining portion 37 is shaped in such a way as to fill the annular space A over a certain circumferential length thereof. In other words, the movable retaining portion 37 extends in the annular space A over a certain circumferential length and has a radially outside surface having a shape matching the inner circumferential surface 9 of the outer ring 3 and a radially inside surface having a shape matching the outer circumferential surface 7 of the inner ring 5. Moreover, the cross sectional shape of the movable retaining portion 37 matches the cross sectional shape of the annular space A. The movable retaining portion 37 has a circumferential length substantially equal to the circumferential length of the fixed retaining portion 31. The movable retaining portions 37 keep the radial distance between the inner ring 5 and the outer ring 3 constant and retain the second rollers 23, as will be described later.

As shown in FIG. 1A, each of the fixed retaining portions 31 of the fixed retainer 27 is arranged on the clockwise side of each recess 11, more specifically on the clockwise side of each first recessed portion 13. Each of the fixed retaining portions 31 extends circumferentially to a position close to the middle of two circumferentially adjacent recessed portions 11. Each of the movable retaining portions 37 of the movable retainer 33 is arranged on the anticlockwise side of each recess 11, more specifically on the anticlockwise side of each second recessed portion 15. Each of the movable retaining portions 37 extends circumferentially to a position close to the middle of two circumferentially adjacent recessed portions 11. Thus, in the portion of the annular space A between two circumferentially adjacent recesses 11, the fixed retaining portion 31 is arranged on the anticlockwise side, and the movable retaining portion 37 is arranged on the clockwise side.

The anticlockwise end of the fixed retaining portion 31 is provided with a recess 39. A spring 41 is set in the recess 39 in a stretchable manner. The spring 41 biases the first roller 19 in the anticlockwise direction, namely toward the narrower side of the first wedge-shaped space W1 formed by the first cam surface 21 of the inner ring 5 and the inner circumferential surface 9 of the outer ring 3. In this state, the first roller 19 engages with the first cam surface 21 of the inner ring 5 and the inner circumferential surface 9 of the outer ring 3. Then, the one-way clutch 1 is in the locked state, in which the torque can be transmitted from the inner ring 5 to the outer ring 3 or from the outer ring 3 to the inner ring 5. As above, the fixed retaining portion 31 biases the first roller 19 to the position at which the roller 19 engages with the first cam surface 21 of the inner ring 5 and the inner circumferential surface 9 of the outer ring 3 or the torque transmission position by means of the spring 41.

The portion of the radially inside surface of the movable retaining portion 37 that extends from a location near its middle with respect to the circumferential direction to the clockwise end constitutes an inclined surface 43 that is inclined in such a way that the interval between the portion of the radially inside surface of the movable retaining portion 37 and the outer circumferential surface 7 of the inner ring 5 increases toward the clockwise end. The anticlockwise end of the inclined surface 43 is located near the anticlockwise end of the recess 11, that is, the anticlockwise end of the second cam surface 25. The inclined surface 43 is inclined in such a way that the interior angles of the triangle formed by the point of contact of the second roller 23 and the inclined surface 43, the point of contact of the second roller 23 and the first roller 19, and the point of contact of the second roller 23 and the second cam surface 25 are all 60 degrees.

The inclined surface 43 is located radially outside the second cam surface 25 and covers the second cam surface 25 radially outside the second cam surface 25. Thus, the second cam surface 25 of the inner ring 5 and the inclined surface 43 of the movable retaining portion 37 defines a second wedge-shaped space W2 therebetween. The radial dimension of the second wedge-shaped space W2 or the distance between the second cam surface 25 of the inner ring 5 and the inclined surface 43 decreases in the anticlockwise direction and increases in the clockwise direction. The radial dimension of the narrower portion of the second wedge-shaped space W2 is smaller than the diameter of the second roller 23.

When the one-way clutch 1 is in the locked state, the second roller 23 is in contact with the second cam surface 25 of the inner ring 5 and the inclined surface 43 of the movable retaining portion 37. Thus, the movable retaining portion 37 keeps the second roller 23 in contact with the second cam surface 25 by the inclined surface 43. Moreover, the second roller 23 is also in contact with the outer circumference surface of the first roller 19 on the anticlockwise side of the first roller 19. Since the first roller 19 is biased by the spring 41 in the anticlockwise direction, the second roller 23, which is in contact with the first roller 19 is also biased in the anticlockwise direction via the first roller 19. Thus, the second roller 23 is biased toward the narrower side of the second wedge-shaped space W2 to engage with the second cam surface 25 of the inner ring 5 and the inclined surface 43 of the movable retaining portion 37. In this way, the spring 41 of the fixed retaining portion 31 biases the second roller 23 via the first roller 19 to a position at which the second roller 23 engages with the second cam surface 25 of the inner ring 5 and the inclined surface 43.

As above, in this embodiment, when the one-way clutch 1 is in the locked state, the first roller 19 is located in the narrower portion of the first wedge-shaped space W1 to engage with the first cam surface 21 of the inner ring 5 and the inner circumferential surface 9 of the outer ring 3, and the second roller 23 is located in the narrower portion of the second wedge-shaped space W2 to engage with the second cam surface 25 of the inner ring 5 and the inclined surface 43 of the movable retaining portion 37.

Next, how the components of the one-way clutch 1 act when the state of the one-way clutch 1 is changed from the locked state to the unlocked state will be described.

Figure 2:
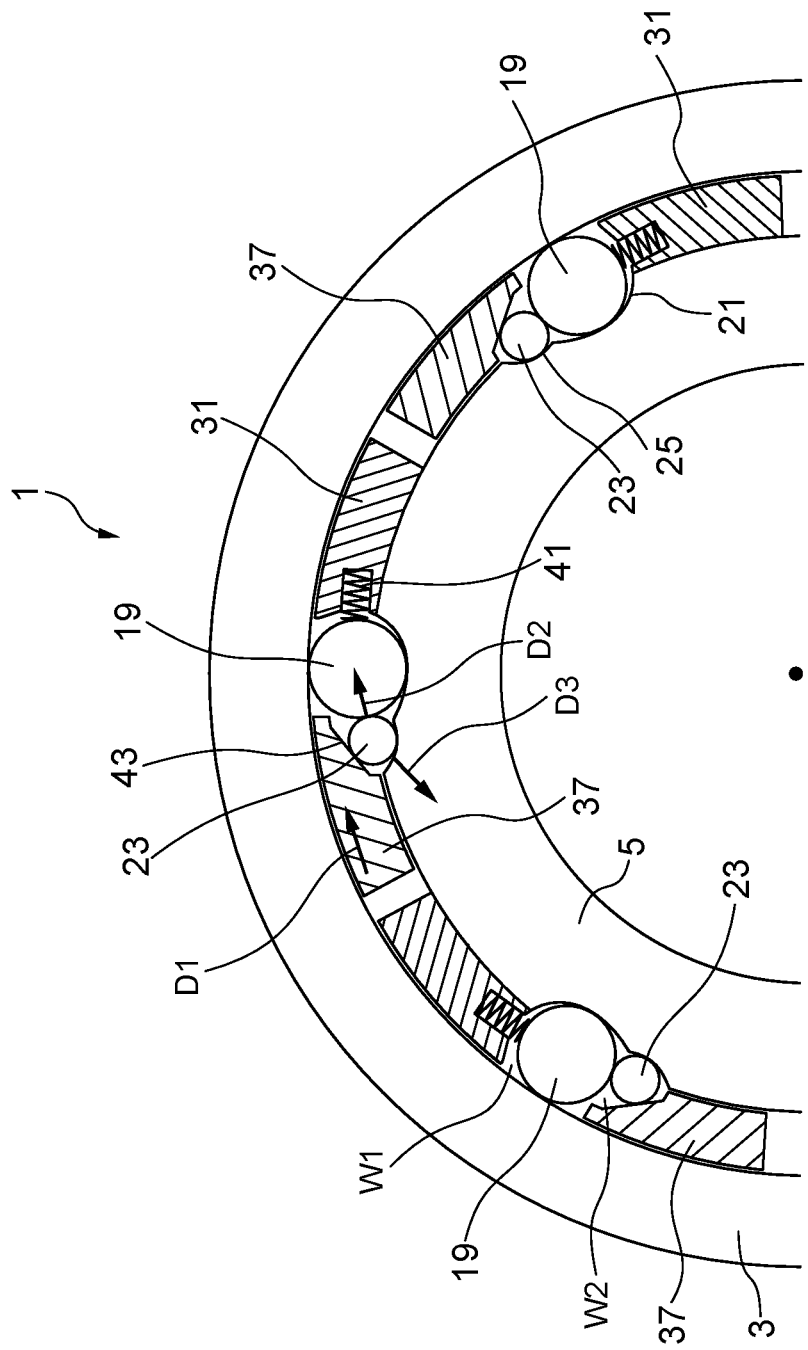
FIG. 2 is a partial cross sectional view of the one-way clutch according to the first embodiment in the unlocked state seen from the axial direction.

FIG. 2 is a partial cross sectional view of the one-way clutch according to the first embodiment in the unlocked state seen from the axil direction.

When unlocking the one-way clutch 1, an unlocking torque of a predetermined magnitude is input to the movable retainer 33 by an external apparatus (not shown) that generates the unlocking torque (which will be simply referred to as the "external apparatus" hereinafter). Specifically, in this embodiment, a torque that causes the annular portion 35 of the movable retainer 33 to turn in the clockwise direction is input to the movable retainer 33.

As the movable retainer 33 turns in the clockwise direction, the movable retaining portions 37 of the movable retainer 33 move in the clockwise direction in the annular space A as indicated by an arrow D1 in FIG. 2. As each movable retaining portion 37 moves in the annular space A in the clockwise direction, the second roller 23 is thrusted by the inclined surface 43 of the movable retaining portion 37 in the clockwise direction and in the radially inward direction as well. Thus, a clockwise torque is transmitted from the movable retaining portion 37 to the second roller 23. In consequence, the second roller is thrusted by the inclined surface 43 against the second cam surface 25 of the inner ring 5 and turns in the clockwise direction while rolling or sliding on the second cam surface 25 of the inner ring 5 and the inclined surface 43 of the movable retaining portion 37. Thus, the second roller 23 moves in the clockwise direction while rolling or sliding on the second cam surface 25 of the inner ring 5.

As the second roller 23 moves in the clockwise direction, the second roller 23 pushes the first roller 19, which is in contact with the second roller 23, in the clockwise direction. Thus, a clockwise torque is transmitted from the movable retaining portion 37 to the first roller 19 via the second roller 23. The first roller 19 thus thrusted by the second roller 23 moves toward the wider side of the first wedge-shaped space W1 while compressing the spring 41.

As the second roller 23 rolls or slides on the second cam surface 25 of the inner ring 5 to move in the clockwise direction, it pushes the first roller 19 in the clockwise direction and, at the same time, causes the inner ring 5 to turn in the anticlockwise direction as indicated by an arrow D3 in FIG. 2. In other words, the second roller 23 transmits an anticlockwise rotational force to the inner ring 5 with a radially inward thrust force applied to it by the inclined surface 43 of the movable retaining portion 37.

In this way, the clockwise torque is transmitted from the movable retaining portion 37 to the inner ring 5 as a rotational force via the second roller 23. The rotational force transmitted from the second roller 23 to the inner ring 5 is in the direction in which the first roller 19 is disengaged from the first cam surface 21 of the inner ring 5 and the inner circumferential surface 9 of the outer ring 3.

As above, the second roller 23 pushes the first roller 19 toward the wider side of the first wedge-shaped space W1 and transmits a rotational force in the unlocking direction to the inner ring 5. Consequently, the first roller 19 is disengaged from the first cam surface 21 of the inner ring 5 and the inner circumferential surface 9 of the outer ring 3.

Thus, the one-way clutch 1 is unlocked. When the one-way clutch 1 is unlocked, the inner ring 5 can turn in the clockwise direction relative to the outer ring 3, and the one-way clutch 1 is in a state in which torque is not transmitted from the inner ring 5 to the outer ring 3 or from the outer ring 3 to the inner ring 5. In other words, the movable retaining portions 37 keep the first rollers 19 at positions at which they do not transmit torque, via the second rollers 23. As will be understood, the fixed retainer 27, the movable retainer 33, the first rollers 19, and the second rollers 23 rotate together with the inner ring 5.

When the one-way clutch 1 is in the unlocked state, while the movable retaining portion 37 after its shift in the clockwise direction is in contact with the second roller 23 by its inclined surface 43 as shown in FIG. 2, the first roller 19 is in contact with neither the inclined surface 43 nor the end of the movable retaining portion 37. Therefore, a torque in the unlocking direction is transmitted to the first roller 19 only by the second roller 23. In this embodiment, as above, the movable retaining portion 37 of the movable retainer 33 transmits the unlocking torque input from the external apparatus distributively to the first roller 19 and the inner ring 5 via the second roller 23. Therefore, the magnitude of the torque for moving the movable retaining portions 37 in the unlocking direction can be made smaller as compared to conventional arrangements.

Moreover, the inclined surface 43 of the movable retaining portion 37 is gently inclined relative to the tangential line of the outer circumferential surface 7 of the inner ring 5 at the position opposed to the anticlockwise end of the inclined surface 43, and the diameter of the second roller 23 is small. Therefore, the second roller 23 can be rolled easily by the inclined surface 43 of the movable retaining portion 37 as the movable retaining portion 37 moves. Therefore, the magnitude of the torque for moving the movable retaining portions 37 in the unlocking direction can be made further smaller. Therefore, the magnitude of the unlocking torque generated by the external apparatus (not shown) can be made smaller as compared to the conventional arrangements, enabling downsizing of the external apparatus. With downsizing of the external apparatus, the installation space of the external apparatus and the size of the overall apparatus including the one-way clutch 1 and the external apparatus can be made smaller.

In this embodiment, as described above, the first roller 19 engages with the first cam surface 21 of the inner ring 5 and the inner circumferential surface 9 of the outer ring 3 in the first wedge-shaped space W1, and the second roller 23 engages with the second cam surface 25 of the inner ring 5 and the inclined surface 43 of the movable retaining portion 37 in the second wedge-shaped space W2. Thus, the first roller 19 and the second roller 23 engages with the respective corresponding components at different positions. Therefore, when the one-way clutch 1 is in the locked state, the second roller 23 will never push the first roller 19 in the unlocking direction. Therefore, the locked state can be maintained reliably, and a required torque capacity can be achieved.

In the case of the one-way clutches having a conventional structure like that described in the description of the background art, in order to facilitate disengagement of the roller from the cam surface of the inner ring and the inner circumferential surface of the outer ring when unlocking the one-way clutch, the wedge angle between the cam surface of the inner ring and the inner circumferential surface of the outer ring is set large so as to reduce the frictional force between the roller and the cam surface of the inner ring and between the roller and the inner circumferential surface of the outer ring. This can invite slippage of roller relative to the cam surface of the inner ring and the inner circumferential surface of the outer ring before the locked state is established, possibly leading to decreased reliability of locking. Moreover, there is a possibility that the wedge angle between the cam surface of the inner ring and the inner circumferential surface of the outer ring may be larger than an optimum wedge angle that ensures a required torque capacity. Then, the required torque capacity cannot be achieved.

In the case of the one-way clutch 1 according to this embodiment, the first roller 19 engages with the first cam surface 21 of the inner ring 5 and the inner circumferential surface 9 of the outer ring 3 smoothly, and unlocking can be carried out smoothly by means of the second roller 23. Therefore, in the one-way clutch 1 according to this embodiment, the wedge angle between the first cam surface 21 of the inner ring 5 and the inner circumferential surface 9 of the outer ring 3 can be set to an optimum angle that ensures a required torque capacity. In other words, in the case of the one-way clutch 1 according to the embodiment, the first roller 19 engages with the first cam surface 21 of the inner ring 5 and the inner circumferential surface 9 of the outer ring 3 reliably and unlocking can be carried out smoothly, while the wedge angle between the first cam surface 21 of the inner ring 5 and the inner circumferential surface 9 of the outer ring 3 is set to the aforementioned optimum angle. Therefore, the one-way clutch 1 can ensure a required torque capacity and function satisfactorily.

When changing the state of the one-way clutch 1 from the unlocked state back to the locked state again, input of the unlocking torque to the movable retainer 33 from the external apparatus is stopped. Then, the spring 41 of the fixed retaining portion 31 stretches to thrust the first roller 19, the second roller 23, and the movable retaining portion 37 of the movable retainer 33 in the anticlockwise direction. This brings the first roller 19 into engagement with the first cam surface 21 of the inner ring 5 and the inner circumferential surface 9 of the outer ring 3, thereby locking the inner ring 5 and the outer ring 3. Thus, the one-way clutch 1 is in the locked state. Instead of stopping the input of unlocking torque to the movable retainer 33 from the external apparatus, a torque for turning the annular portion 35 of the movable retainer 33 in the anticlockwise direction may be input to the movable retainer 33 from the external apparatus.

Second Embodiment

In the following, a one-way clutch according to a second embodiment of the present invention will be described.

Figures 3A, 3B:
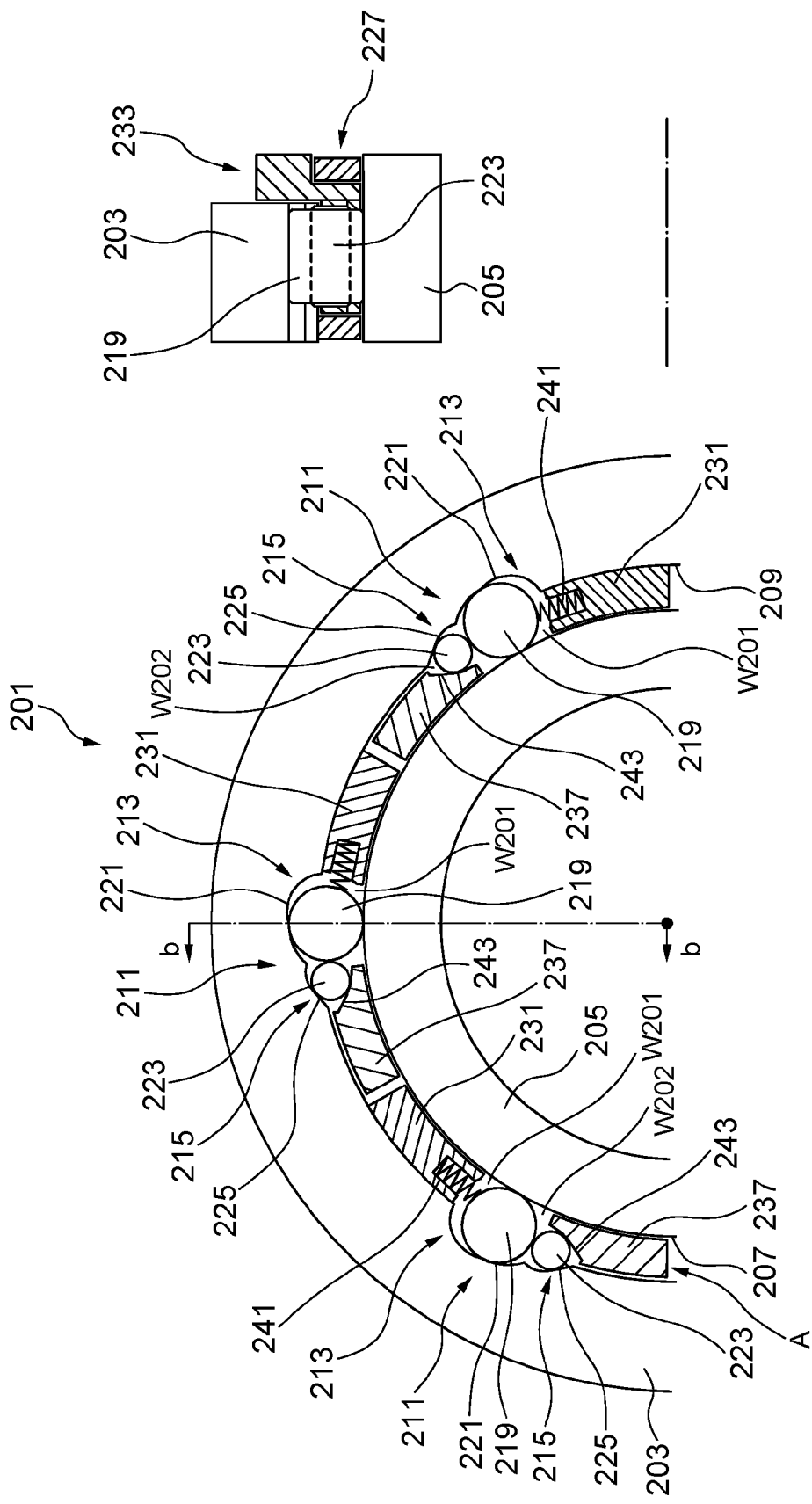
FIG. 3A is a partial cross sectional view of the one-way clutch according to a second embodiment in the locked state seen from an axial direction.
FIG. 3B is a cross sectional view taken along line b-b in FIG. 3A.
Figures 4A, 4B:
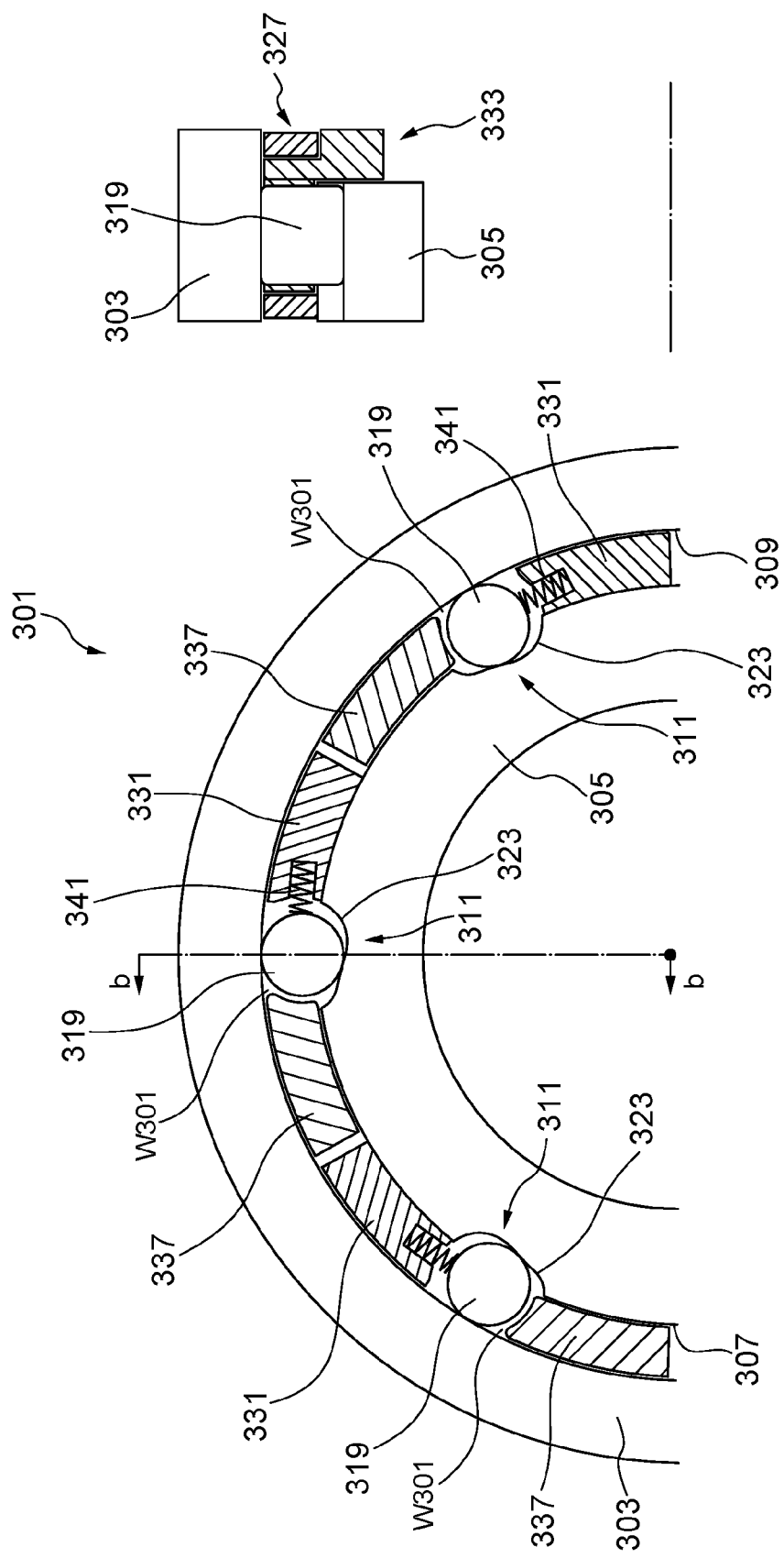
FIG. 4A is a partial cross sectional view of the one-way clutch according to a prior art in the locked state seen from an axial direction.
FIG. 4B is a cross sectional view taken along line b-b in FIG. 4A.
Figure 5:
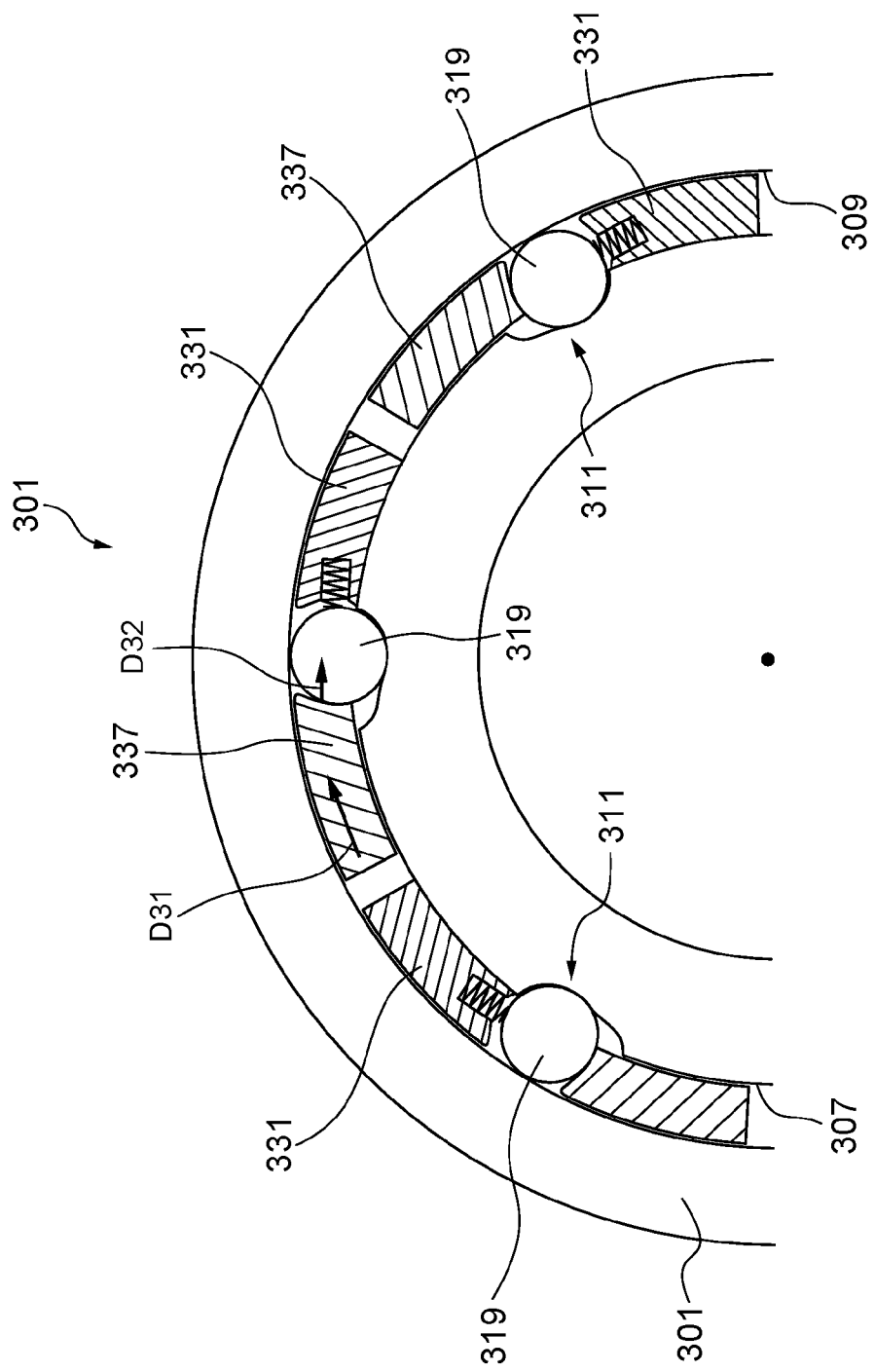
FIG. 5 is a partial cross sectional view of the one-way clutch according to the prior art in the unlocked state seen from the axial direction.

FIG. 3A is a partial cross sectional view of the one-way clutch according to the second embodiment in the locked state seen from an axial direction. FIG. 3B is a cross sectional view taken along line b-b in FIG. 3A.

When the one-way clutch according to the second embodiment is in the locked state, anticlockwise rotation of the outer ring relative to the inner ring is prevented.

The second embodiment is different from the first embodiment in this respect. Thus, the outer ring is fixed relative to the inner ring. In the unlocked state, the outer ring can turn in the clockwise direction relative to the inner ring. In the following, features of the one-way clutch according to the second embodiment that are different from those according to the first embodiment will be mainly described, and like features will not be described.

As shown in FIG. 3A, in the one-way clutch 201 according to the second embodiment, the inner circumferential surface 209 of the outer ring 203 is provided with recesses 211, each of which includes a first cam surface 221 and a second cam surface 225. The shapes of the first cam surface 221 and the second cam surface 225 are same as the first cam surface 21 and the second cam surface 25 in the first embodiment. The outer circumferential surface 207 of the inner ring 205 and the inner circumferential surface 209 of the outer ring 203 serve as roll surfaces or slide surfaces on which first rollers 219 can roll or slide. Moreover, the inner circumferential surface 209 of the outer ring 203 serves as a roll surface or a slide surface on which second rollers 223 can roll or slide. The first cam surface 221 of the outer ring 203 and the outer circumferential surface 207 of the inner ring 205 that is radially opposed to the first cam surface 221 form a first wedge-shaped space W201 therebetween. The radial dimension of the first wedge-shaped space W201 or the distance between the first cam surface 221 of the outer ring 203 and the outer circumferential surface 207 of the inner ring 205 decreases in the anticlockwise direction and increases in the clockwise direction. The radial dimension of the narrower portion of the first wedge-shaped space W201 is smaller than the diameter of the first roller 219.

The one-way clutch 201 according to the second embodiment includes a fixed retainer 227 fixed to the outer ring 203. The fixed retainer 227 has fixed retaining portions 231 and springs 241, which are the same in structure as those in the first embodiment.

The one-way clutch 201 according to the second embodiment includes a movable retainer 233 that is movable relative to the outer ring 203. The movable retainer 233 has movable retaining portions 237. The portion of the radially outside surface of the movable retaining portion 237 that extends from a location near its middle with respect to the circumferential direction to the clockwise end constitutes an inclined surface 243 that is inclined in such a way that the interval between the portion of the radially outside surface of the movable retaining portion 237 and the inner circumferential surface 209 of the outer ring 203 increases toward the clockwise end. The anticlockwise end of the inclined surface 243 is located near the anticlockwise end of the recess 211, that is, the anticlockwise end of the second cam surface 225. The inclined surface 243 is inclined in such a way that the interior angles of the triangle formed by the point of contact of the second roller 223 and the inclined surface 243, the point of contact of the second roller 223 and the first roller 219, and the point of contact of the second roller 223 and the second cam surface 225 are all 60 degrees.

The inclined surface 243 is located radially inside the second cam surface 225 and covers the second cam surface 225 radially inside the second cam surface 225. Thus, the second cam surface 225 of the outer ring 203 and the inclined surface 243 of the movable retaining portion 237 defines a second wedge-shaped space W202 therebetween.

The radial dimension of the second wedge-shaped space W202 or the distance between the second cam surface 225 and the inclined surface 243 decreases in the anticlockwise direction and increases in the clockwise direction. The radial dimension of the narrower portion of the second wedge-shaped space W202 is smaller than the diameter of the second roller 223.

The structures of the first roller 219 and the second roller 223 are the same as those in the first embodiment.

In the second embodiment, when the one-way clutch 201 is in the locked state, the first roller 219 is located in the narrower portion of the first wedge-shaped space W201 and in engagement with the first cam surface 221 of the outer ring 203 and the outer circumferential surface 207 of the inner ring 205, and the second roller 223 is located in the narrower portion of the second wedge-shaped space W202 and in engagement with the second cam surface 225 of the outer ring 203 and the inclined surface 243 of the movable retaining portion 237.

Next, how the components of the one-way clutch 201 act when the state of the one-way clutch 201 according to the second embodiment is changed from the locked state to the unlocked state will be described.

When an unlocking torque is input to the movable retainer 233 by an external apparatus (not shown), the movable retaining portions 237 of the movable retainer 233 move in the clockwise direction in the annular space A, as in the first embodiment. As each movable retaining portion 237 moves in the annular space A in the clockwise direction, the second roller 223 is thrust by the inclined surface 243 of the movable retaining portion 237 in the clockwise direction and in the radially outward direction as well. Thus, a clockwise torque is transmitted from the movable retaining portion 237 to the second roller 223. In consequence, the second roller 223 is thrust by the inclined surface 243 against the second cam surface 225 and turns in the clockwise direction while rolling or sliding on the second cam surface 225 and the inclined surface 243 of the movable retaining portion 237. Thus, the second roller 223 moves in the clockwise direction while rolling or sliding on the second cam surface 225.

As the second roller 223 moves in the clockwise direction, the second roller 223 pushes the first roller 219, which is in contact with the second roller 223, in the clockwise direction. Thus, a clockwise torque is transmitted from the movable retaining portion 237 to the first roller 219 via the second roller 223. The first roller 219 thus thrusted by the second roller 223 moves toward the wider side of the first wedge-shaped space W201 while compressing the spring 241.

As the second roller 223 rolls or slides on the second cam surface 225 to move in the clockwise direction, it pushes the first roller 219 in the clockwise direction and, at the same time, causes the outer ring 203 to turn in the anticlockwise direction. In other words, the second roller 223 transmits an anticlockwise rotational force to the outer ring 203 with a radially outward thrust force applied to it by the inclined surface 243 of the movable retaining portion 237. In this way, the clockwise torque is transmitted from the movable retaining portion 237 to the outer ring 203 as a rotational force via the second roller 223. The rotational force transmitted from the second roller 223 to the outer ring 203 is in the direction in which the first roller 219 is disengaged from the first cam surface 221 of the outer ring 203 and the outer circumferential surface 207 of the inner ring 205.

As above, the second roller 223 pushes the first roller 219 toward the wider side of the first wedge-shaped space W201 and transmits a rotational force in the unlocking direction to the outer ring 203. Consequently, the first roller 219 is disengaged from the first cam surface 221 and the outer circumferential surface 207 of the inner ring 205.

Thus, the one-way clutch 201 is unlocked. When the one-way clutch 201 is unlocked, the outer ring 203 can turn in the clockwise direction relative to the inner ring 205, and the one-way clutch 201 is in a state in which torque is not transmitted from the inner ring 205 to the outer ring 203 or from the outer ring 203 to the inner ring 205. In other words, the movable retaining portions 237 keep the first rollers 219 at positions at which they do not transmit torque, via the second rollers 223. As will be understood, the fixed retainer 227, the movable retainer 233, the first rollers 219, and the second rollers 223 rotate together with the outer ring 203.

As above, in the second embodiment also as in the first embodiment, the movable retaining portion 237 of the movable retainer 233 transmits the unlocking torque input from the external apparatus distributively to the first roller 219 and the outer ring 203 via the second roller 223. Moreover, the inclined surface 243 of the movable retaining portion 237 is gently inclined relative to the tangential line of the inner circumferential surface 209 of the outer ring 203 at the position opposed to the anticlockwise end of the inclined surface 243, and the diameter of the second roller 223 is small. Therefore, the second roller 223 can be rolled easily by the inclined surface 243 of the movable retaining portion 237 as the movable retaining portion 237 moves. Therefore, as in the first embodiment, the magnitude of the torque for moving the movable retaining portions 237 in the unlocking direction can be made smaller as compared to conventional arrangements. Therefore, as in the first embodiment, the magnitude of the unlocking torque generated by the external apparatus (not shown) can be made smaller as compared to the conventional arrangements, enabling downsizing of the external apparatus. With downsizing of the external apparatus, the installation space of the external apparatus and the size of the overall apparatus including the one-way clutch 201 and the external apparatus can be made smaller.

As in the first embodiment, the first roller 219 engages with the first cam surface 221 of the outer ring 203 and the outer circumferential surface 207 of the inner ring 205 reliably and unlocking can be carried out smoothly, while the wedge angle between the first cam surface 221 of the outer ring 203 and the outer circumferential surface 207 of the inner ring 205 is set to an optimum angle for achieving a required torque capacity. Therefore, the one-way clutch 201 according to the second embodiment can ensure a required torque capacity and function satisfactorily.

REFERENCE SINGS LIST 1, 201: one-way clutch
3, 203: outer ring
5, 205: inner ring
7, 207: the outer circumferential surface of the inner ring
9, 209: inner circumferential surface of the outer ring
11, 211: recess
13, 213: first recessed portion
15, 215: second recessed portion
17: step portion
19, 219: first roller
21, 211: first cam surface
23, 223: second roller
25, 225: second cam surface
27, 227: fixed retainer
29: annular portion
31, 231: fixed retaining portion
33, 233: movable retainer
35: annular portion
37, 237: movable retaining portion
39: recess
41, 241: spring
43, 243: inclined surface

What is claimed is:

1. A one-way clutch comprising:
an inner ring;
an outer ring arranged coaxially with said inner ring;
a plurality of first torque transmission members provided between said inner ring and said outer ring at predetermined circumferential intervals and used to transmit a first torque between said inner ring and said outer ring;
a plurality of spring members that bias said plurality of first torque transmission members to their respective torque transmission positions;
a plurality of retaining portions arranged between the adjacent first torque transmission members in one-to-one correspondence with the first torque transmission members and capable of shifting said corresponding first torque transmission members from said torque transmission positions to torque transmission incapable positions by moving in one circumferential direction toward said corresponding first torque transmission members, and retaining said first torque transmission members at said torque transmission incapable positions; and
a second torque transmission member provided between each of said retaining portions and said first torque transmission member corresponding thereto and used to transmit a second torque from said retaining portion to said corresponding first torque transmission member and to one of said inner ring and said outer ring when said retaining portion moves in said one circumferential direction.

2. A one-way clutch according to claim 1, wherein said inner ring or said outer ring has a roll surface or slide surface provided with a plurality of first cam surfaces with which said plurality of first torque transmission members engage and a plurality of second cam surfaces with which said plurality of second torque transmission members engage, and when each of said retaining portions moves in said one circumferential direction, said second torque is transmitted from said retaining portion to said corresponding first torque transmission member and to said inner ring or said outer ring via said second torque transmission member.

3. A one-way clutch according to claim 2, wherein a portion of said retaining portion on said one circumferential direction side is radially opposed to said second cam surface, and the surface of said portion of said retaining portion on said one circumferential direction side opposed to said second cam surface comprises an inclined surface that is inclined in such a direction that the radial interval between the surface of said portion of said retaining portion on said one circumferential direction side opposed to said second cam surface and said second cam surface increases in said one circumferential direction.

4. A one-way clutch according to claim 3, wherein said second torque transmission member moves in said one circumferential direction while rolling or sliding on said second cam surface and said inclined surface, thereby pushing said first torque transmission member in said one circumferential direction and transmitting a rotational force to said inner ring or said outer ring.

5. A one-way clutch according to claim 1, wherein a portion of said retaining portion on said one circumferential direction side is radially opposed to said second cam surface, and the surface of said portion of said retaining portion on said one circumferential direction side opposed to said second cam surface comprises an inclined surface that is inclined in such a direction that the radial interval between the surface of said portion of said retaining portion on said one circumferential direction side opposed to said second cam surface and said second cam surface increases in said one circumferential direction.

6. A one-way clutch according to claim 5, wherein said second torque transmission member moves in said one circumferential direction while rolling or sliding on said second cam surface and said inclined surface, thereby pushing said first torque transmission member in said one circumferential direction and transmitting a rotational force to said inner ring or said outer ring.

* * * * *